United States Patent Office 3,732,202
Patented May 8, 1973

3,732,202
PROCESS FOR EXTRACTING OLEANOLIC ACID-3-DIGLUCOSIDE AND PRODUCTS OBTAINED THEREFROM
Kenneth Jewers, Bromley, Kent, and Terence Albert King, London, England, assignors to The Solicitor for the Affairs of Her Majesty's Treasury, London, England
No Drawing. Filed June 19, 1969, Ser. No. 834,881
Claims priority, application Great Britain, June 21, 1968, 29,760/68
Int. Cl. C07c 47/18
U.S. Cl. 260—210 R
11 Claims

ABSTRACT OF THE DISCLOSURE

A molluscicidally active agent is obtained by alcoholic extraction of *Phytolacca dodecandra*, particularly berries thereof, and alkaline hydrolysis of the extract.

The active material is identified as the diglucoside of oleanolic acid. Analogues thereof are also disclosed. The active material is stable and effective in natural waters at concentrations of about 5–10 p.p.m.

---

This invention relates to molluscicides.

Molluscs have been found to be responsible for the spread of many human and animal infections particularly in tropical regions, especially bilharzia and fascioliasis. These are major diseases in Africa, Asia and South America, the causative agent being certain species of nematodes of the genus Schistosoma. It has been found that in the life cycle of Schistosoma, water-snails act as a host at the larval stage in the development of the worm and the disease can be transmitted to humans who come into contact with the water in which infected water-snails have been living. A measure of control of bilharzia can be achieved by an attack on the snails which act as a vector in the transmission of the disease, and hence there is a need for materials capable of controlling the growth of the species of snail that can act as host to the disease causing organisms.

Molluscicidal agents to be used effectively in the control of the snail vectors should desirably have a high level of toxicity towards the snail species, coupled with low mammalian toxicity and high stability, since it is usually necessary to apply the molluscicidal agents to very large volumes of water, e.g. in rivers, canals, lakes, etc., to ensure that toxic levels of the molluscicide are maintained for prolonged periods of time in the regions where the snail vectors are found.

It has now been found that in the plant *Phytolacca dodecandra* (endod) there exist one or more compounds which are molluscicidally inactive in their naturally occurring form but which can be converted to the active form when extracted from the plant and treated as hereinafter described.

According to the present invention a process for the production of a molluscicidal agent comprises extracting *Phytolacca dodecandra* with an alcoholic solvent and subjecting the material so extracted to alkaline hydrolysis.

It has been found that the berries of *Phytolacca dodecandra* represent the most valuable source of the molluscicidal material, and extraction will normally be from the berries alone which are preferably first dried and ground. The molluscicidal agents also occur in the leaves and/or other parts of the plant, and these may also be used as a source of the molluscicide. However, the cost of processing is increased by the use of these lower yielding materials and removal of too much of the plant tissue may reduce the crop of berries from subsequent harvests.

The molluscicidal agent produced by the process defined above contains triterpenoid saponins having the formula:

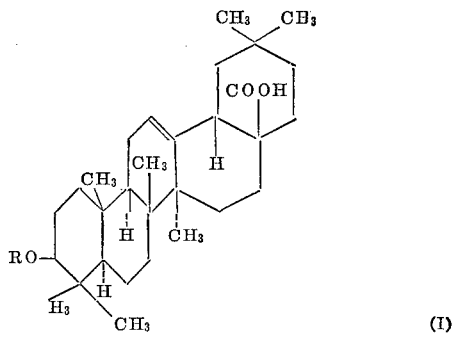

(I)

These materials are glycosides of oleanolic acid having the sugar side chain attached to the ring at position 3. Hydrolytic degradation of the side chains give rise to 2 to 4 sugar units which are predominantly glucose (2 units), smaller amounts of arabinose, rhamnose and xylose also being identified. The major product is therefore oleanolic acid 3-diglucoside.

We have shown that when an alcoholic solvent is used in the extraction of the saponin fraction from endod, an inactive material is isolated in which the carboxyl group is present as a sugar ester. Alkaline hydrolysis of this material has afforded active saponins which contain a free carboxy group. The importance of the free COOH group is also shown by the fact that the methyl ester is also inactive. Alkaline hydrolysis leaves the glycosidic side chain attached to the 3 β-oxygen of oleanolic acid unaffected. Comparative tests have indicated that it is possible to recover approximately twice as much molluscicidal saponin from endod by alcoholic extraction than by aqueous extraction.

The extraction is preferably carried out on defatted berries which are then exhaustively extracted with a hot alcoholic solvent, conveniently refluxing methanol or ethanol, which may contain small amounts of water, perhaps 5 to 15% by weight. Most of the extractable saponin is extracted within about 12 hours, following which, the extract, conveniently in the same alcoholic solvent, may be made alkaline, for example by the addition of an alkali metal hydroxide such as sodium or potassium hydroxide, to give an alcoholic alkaline solution which can be refluxed for several hours to ensure that the ester group is converted to the free carboxy group. Alternatively, the alcoholic extract of the berries may be evaporated to remove alcohol and the residue subject to alkaline hydrolysis in aqueous medium. In the latter case it is possible to dispense with the initial defatting step and to remove the fat layer when the residue of the alcoholic extract is dispersed in the aqueous alkali.

The saponin may be recovered from the alcoholic alkaline solution by neutralisation, to about pH 6 to 7, conveniently by the addition of hydrochloric acid, either as a gas or as a methanolic solution.

The glycosidic side chain may be removed from the saponin to give the sapogenin, oleanolic acid, which may be converted to novel water dispersable molluscicidal agents by esterification at the 3 β-hydroxy group with certain carboxylic acid.

Oleanolic acid may be obtained from the endod molluscicide or from the carboxy ester thereof described above, by acid hydrolysis, e.g. using hydrochloric acid, which will cleave off the glycosidic side chain and also convert at the same time a carboxylic ester group to the carboxylic acid. The oleanolic acid to be used in the preparation of the synthetic esters need not necessarily be derived from endod or the endod molluscicide, since oleanolic acid is readily obtainable from a large number of plants in the free state or in saponins based on oleanolic acid which can be acid hydrolysed to give oleanolic acid.

The novel esters which represent a further embodiment of the invention are compounds of the general formula:

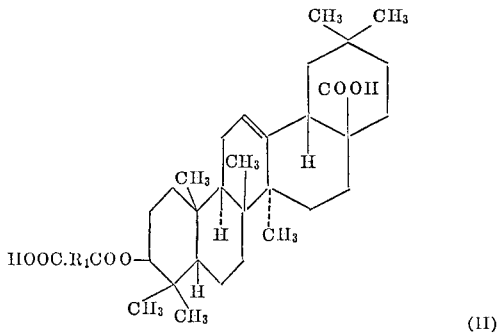

in which $R_1$ represents the residue of a dicarboxylic acid $HOOC \cdot R_1COOH$.

In this dicarboxylic acid, $R_1$ may be a hydrocarbyl group such as an alkylene or phenylene group, and preferred acids include those which form a stable cyclic dicarboxylic acid anhydride, such as succinic acid and phthalic acid. The novel esters may be prepared by conventional esterification techniques, by reacting the dicarboxylic acid or a derivative thereof, e.g. the anhydride or a halide or ester with oleanolic acid, or a 3-hydroxy derivative thereof, under conditions such that a hemi-ester of the dicarboxylic acid is obtained. These conditions are conveniently achieved by reacting approximately equimolar quantities of oleanolic acid and the dicarboxylic acid anhydride in an organic solvent in the presence of a tertiary amine.

The water solubility of the compounds of this invention is very important because of formulation problems. Many molluscicidal agents are only effectively molluscicidal when they are actually dissolved in the water in which the mollusc lives, and it is frequently found that apparently water soluble materials, which are formulated as concentrates in organic solvents, precipitate when added to large volumes of water, so that it is not possible to take full advantage of their molluscicidal activity. The compounds of the present invention, which are glycosides or esters of oleanolic acid, are readily dispersed in water so that it is possible to formulate the material in aqueous solvents as well as in organic solvents, and compositions of both types further embodiments of this invention. Such compositions may contain the usual surface active agents, together with inert diluents, e.g. water or chlorinated hydrocarbon solvents, depending on the particular manner in which the composition is intended to be used in the control of the snail vector. This control is achieved by introducing the molluscicidal agent into the water where molluscs occur and such a method of control forms still a further feature of the invention. Thus, for example, a composition containing at least 100 parts per million (p.p.m.) of active material may be supplied as a drip feed to natural waters at such a rate as to achieve a concentration of at least 5, preferably at least 10 p.p.m. therein.

The following examples are given to illustrate the process of the invention:

EXAMPLE 1

Sample of berries from *Phytolacca dodecandra* is dried and ground to a fine powder. The powdered berries are then defatted by extraction for 24 hours with petroleum ether and 50 g. loaded into a Soxhlet extractor and continuously extracted overnight with 500 ml. refluxing methanol. After 12 hours extraction, the methanol solution is cooled and sufficient methanolic potassium hydroxide added to give a strongly alkaline solution e.g. 5 N. The alkaline solution is refluxed for 3 hours and then allowed to cool. Sufficient methanolic hydrochloric acid is then added to neutralise the solution to about pH 6 to 7. The neutralised solution is filtered to remove precipitated inorganic material and then concentrated down to small bulk and added to diethyl ether. The endod saponin precipitates out and is separated, washed and dried to give about 11 g. of saponin as an amorphous yellow solid. Aqueous extraction of a similar quantity of material yields about 7.5 g. saponin. The endod saponin is identified as a compound of Formula I.

EXAMPLE 2

The procedure of Example 1 is followed up to the end of the Soxhlet extraction with methanol. The methanolic solution is then evaporated to dryness and a portion (10 g.) of the saponin is refluxed with normal aqueous potassium hydroxide (1 litre) for 4 hours. The product is cooled and then acidified with concentrated hydrochloric acid (85 ml.). The product is then freeze-dried or spray-dried, yield 61.8 g. This product contains KCl which may be removed, if desired, by extraction with alcohol.

EXAMPLE 3

The *Phytolacca dodecandra* berries (50 g.) are ground and extracted with methanol or 95% ethanol for 12 hours. The extract is then evaporated to dryness and the product (13.4 g.) is dispersed in water (1 litre). A fatty layer appears which is then separated either mechanically or by extraction with a fat solvent e.g. ether. The defatted aqueous product is then refluxed with potassium hydroxide (50 g.) or equivalent sodium hydroxide for 4 hours and worked up as described in Example 1, yield (69 g.).

EXAMPLE 4

0.73 of the endod molluscicide obtained in Example 1 is dissolved in a mixture of 1 N sulphuric acid in 250 ml. dioxane and water (1:3) which is refluxed for 3 hours to hydrolyse the glycosidic side chain. This is extracted three times with chloroform, washed, dried and evaporated. Chromatography and crystallisation affords oleanolic acid (102 mg.); M.P. 309–311° C. $(a)_D^{23}$ $+77°$ (CHCl$_3$), as the major aglycone.

0.36 g. oleanolic acid obtained as described above and 0.7 g. succinic anhydride are dissolved in 50 ml. pyridine and the mixture refluxed for 24 hours. The refluxed mixture is cooled and added to iced hydrochloric acid. The acidic mixture is extracted with diethyl ether and the ether extracted, washed, dried and evaporated to give the hemi-succinate of oleanolic acid, M.P. 255–7° C. (decomp.), Formula II where $R_1$ is $CH_2$.

The glycoside and ester of oleanolic acid described above have been found to have a useful level of toxicity towards species of mollusc responsible for the transmission of human and animal disease. They are toxic towards species of Biomphalaria and Bulinus, which are known to be carriers of Schistosoma, and to species of Lymneae, which act as host to Fasciola organisms causing liver fluke infection in cattle and sheep. The products are also toxic to leaches.

The toxicity of the product of Example 1 to *Biomphalaria glabrata* has been determined in a test at pH 6.3 in aqueous solution. In this test, groups of 10 snails are exposed to the molluscide at varying concentrations for 24 hours and are then transferred into ordinary water for a further 24-hour period. A mortality count is taken at the end of the second 24-hour period and an LC$_{50}$ figure, the concentration necessary to kill 50% of the sample, is calculated. An LC$_{50}$ value of 1 to 2 parts per million is found at pH 6.3, at pH 7.4 LC$_{50}$ is about 5 parts per million. The LD$_{50}$ value for this compound, when administered orally to mice, is >500 mg./kg. body weight, indicating low mammalian toxicity by this route. An LC$_{50}$ value in the hemi-succinate described in Example 4 is determined in a similar test and found to be 1.6 p.p.m. at pH 6.3.

One further and particularly important advantage of the compounds of the present invention as compared with molluscicides available hitherto is the fact that they are extremely stable. For example, they are stable to boiling water. Furthermore, they are especially stable on storage and may be kept in transparent glass bottles for up to 12 months without significant loss of activity. Existing molluscicides on the other hand are very unstable compounds and require to be protected from light and they have a comparatively short shelf life.

We claim:

1. Process for the production of oleanolic acid-3-diglucoside or an alkali metal salt thereof which comprises extracting *Phytolacca dodecandra* with a medium comprising a lower alkanol and subjecting the material extracted to alkaline hydrolysis.

2. Process according to claim 1, in which the berries of the plant are used.

3. Process according to claim 2, in which the berries are defatted prior to extraction.

4. Process according to claim 1, in which the hydrolysis is conducted in alcoholic medium.

5. Process according to claim 1, in which the alcoholic solvent is removed after extraction and the residue is hydrolysed in aqueous alkaline solution.

6. Process according to claim 1, in which oleanolic acid-3-diglycoside is recovered in solid form after acidification of the hydrolysate.

7. Process according to claim 1 in which the hydrolysis is conducted in an aqueous medium and the alkali metal salt of oleanolic acid-3-diglucoside is recovered from the aqueous phase of an unacidified hydrolysate.

8. A compound selected from the group consisting of oleanolic acid - 3 - diglucoside and an alkali metal salt thereof.

9. The compound according to claim 8 which is oleanolic acid-3-diglucoside.

10. A compound according to claim 8 which is an alkali metal salt of oleanolic acid-3-diglucoside.

11. The compound according to claim 10 which is the potassium salt of oleanolic acid-3-diglucoside.

References Cited

UNITED STATES PATENTS

| 3,442,911 | 5/1969 | Baxendale | 260—210 R |
| 3,464,972 | 9/1969 | Rocher | 260—210.5 |

OTHER REFERENCES

Shaaban et al., "Chem. Abst.," vol. 53, 1959, p. 17340 (a).

Wyler et al., "Chem. Abst.," vol. 55, 1961, p. 14500 (a).

Takemoto et al., "Chem. Abst.," vol. 63, 1965, pp. 10051(h)–10054(h).

LEWIS GOTTS, Primary Examiner

J. R. BROWN, Assistant Examiner

U.S. Cl. X.R.

260—485 R; 424—180